United States Patent [19]
Kondo

[11] 3,971,595
[45] July 27, 1976

[54] ANTI-SKID BRAKE CONTROL SYSTEM

[75] Inventor: Toshiyuki Kondo, Toyota, Japan

[73] Assignee: Aisin Seiki Kabushiki Kaisha, Kariya, Japan

[22] Filed: Aug. 26, 1975

[21] Appl. No.: 607,786

[30] Foreign Application Priority Data
Aug. 26, 1974 Japan.............................. 49-97060

[52] U.S. Cl. ............................. 303/21 F; 303/10
[51] Int. Cl.² .......................................... B60T 8/06
[58] Field of Search........... 188/181 A; 303/10, 6 R, 303/21 F, 54

[56] References Cited
UNITED STATES PATENTS

| | | | |
|---|---|---|---|
| 3,761,140 | 9/1973 | Lewis et al. ....................... | 303/21 F |
| 3,910,645 | 10/1975 | Takeuchi et al................... | 303/21 F |

*Primary Examiner*—Duane A. Reger
*Attorney, Agent, or Firm*—Oblon, Fisher, Spivak, McClelland & Maier

[57] ABSTRACT

An anti-skid brake control system includes a source of fluid pressure, front and rear wheel brakes, a brake booster operatively connected to a vehicle brake pedal and capable of generating power hydraulic pressure in accordance with the depression force of such vehicle brake pedal, and a master cylinder operatively connected to the brake booster for supplying fluid pressure to the front and rear wheel brakes in accordance with the actuation of the brake booster. A first control valve is interposed between one of the front wheel brakes and the brake booster and a second control valve is likewise interposed between one of the rear wheel brakes and the brake booster for decreasing the power pressure of the brake booster to the front and rear wheel brakes in accordance with a skid-condition of the front and rear wheel brakes. A first actuator is also interposed between the other one of the front wheel brakes and the master cylinder and a second actuator is likewise interposed between the other one of the rear wheel brakes and the master cylinder for supplying fluid pressure to the front and rear wheel brakes in accordance with the actuation of the master cylinder, fluid pressure thereby being supplied from the master cylinder to the front and rear wheel brakes under normal braking operations and not being supplied thereto under anti-skid conditions.

3 Claims, 4 Drawing Figures

ANTI-SKID BRAKE CONTROL SYSTEM

BACKGROUND OF THE INVENTION

1. Field of the Invention

The present invention relates generally to an anti-skid brake control system, and more particularly to an anti-skid brake control system applicable to a dual brake system wherein one of the braking systems is supplied with fluid pressure from a master cylinder while the other system is supplied with fluid pressure from a hydraulic booster.

2. Description of the Prior Art

Conventionally, a single actuator is provided for an anti-skid brake control apparatus and fluid pressure of a dual brake system is supplied to the actuator, and is simultaneously controlled by means of a valve. However, the construction of the actuator becomes very complex and the characteristic of the actuator, whereby sufficient fluid pressure can be continuously supplied from a brake booster to one of the dual brake systems in accordance with the fluid quantity of a pump, is sacrificed.

SUMMARY OF THE INVENTION

Accordingly, it is an object of the present invention to provide an improved anti-skid brake control system for obviating the above-mentioned drawback characteristic of conventional systems.

Another object of the present invention is to provide a unique and highly simplified anti-skid brake control system.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
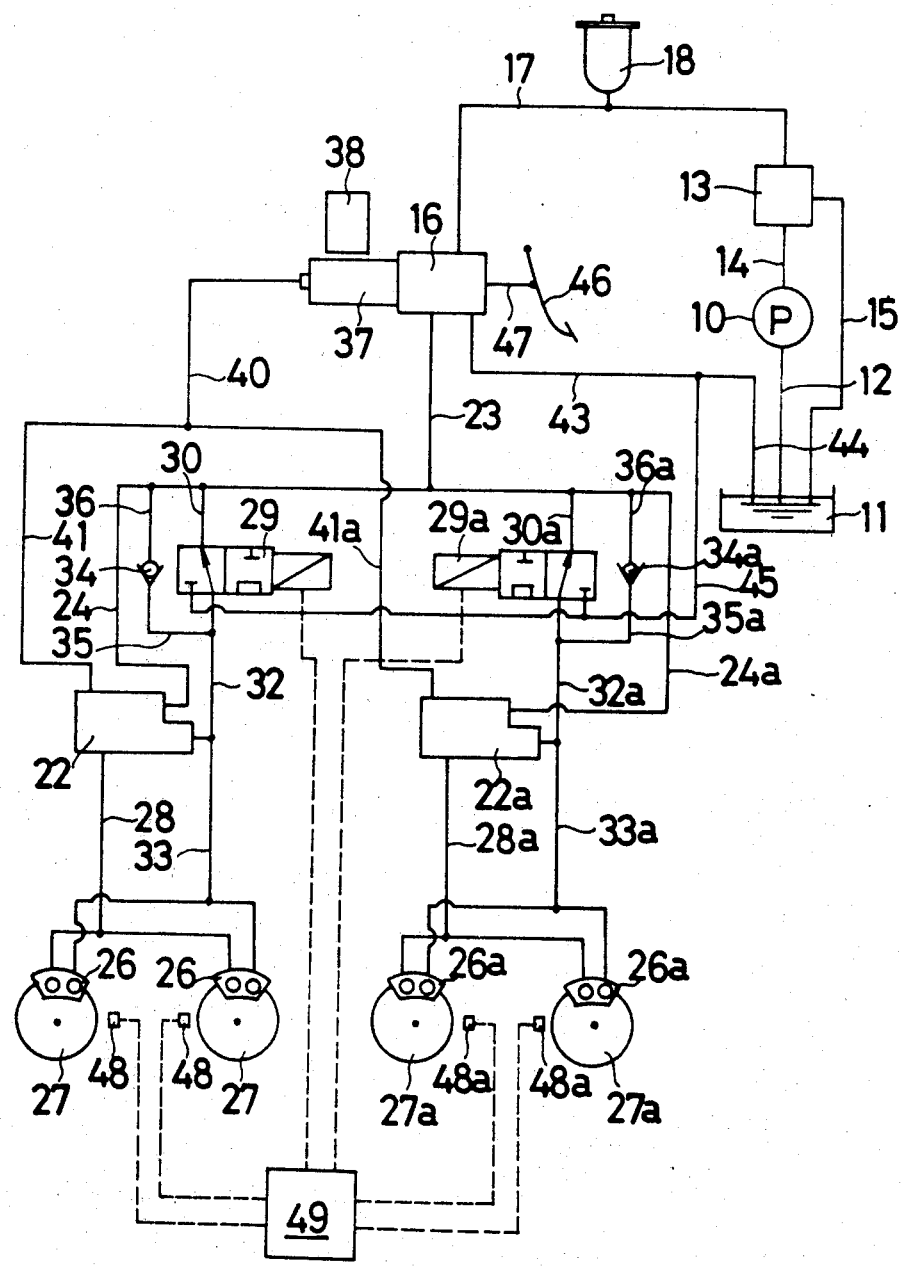
FIG. 1 is a schematic view of one embodiment of a brake system constructed in accordance with the present invention and showing its cooperative parts.

Referring now to the drawings, and more particularly to FIG. 1 thereof, a pump 10, driven by means of the vehicle engine, not shown, is fluidically connected to a reservoir 11 by means of a conduit 12, and an unloader valve 13 is similarly connected to the pump 10 by means of a conduit 14 as well as to the reservoir 11 by means of a conduit 15. A brake booster 16 is also connected to the unloader valve 13 through means of a conduit 17, and an accumulator 18 is disposed within conduit 17 which is connected to an inlet port 19 of the brake booster 16.

An outlet port 20, provided within brake booster 16, is fluidically connected to an inlet port 21 of an actuator 22 through means of conduits 23 and 24, as well as to an inlet port 21a of an actuator 22a through means of conduits 23 and 24a. An outlet port 25, provided within the actuator 22, is in turn connected to wheel cylinders 26 of the front wheels 27 through means of a conduit 28, and the actuator 22a is similarly connected to the wheel cylinders 26a of the rear wheels 27a through means of a conduit 28a. Conduit 24 is seen to also be connected to a control valve 29, utilized for the actuator 22, through means of a conduit 30, and the control valve 29 is in turn connected to a port 31 of actuator 22 by means of a conduit 32 which is further connected to the wheel cylinders 26 of front wheels 27 by means of a conduit 33, a check valve 34 being interposed between conduits 35 and 36 which fluidically connect conduits 24 and 32. Conduit 24a is likewise connected to a control valve 29a, utilized in conjunction with actuator 22a, by means of a conduit 30a, and the control valve 29a is in turn connected to a port 31a of actuator 22a by means of a conduit 32a which is further connected to the wheel cylinders 26a of rear wheels 27a through means of a conduit 33a, a check valve 34a being interposed between conduits 35a and 36a which fluidically connect conduits 24a and 32a.

A master cylinder 37 is mechanically connected to the brake booster 16 and a reservoir 38 is secured upon the master cylinder 37, the latter of which is fluidically connected to an inlet port 39 of actuator 22 by means of conduits 40 and 41, as well as to an inlet port 39a of actuator 22a by means of conduits 40 and 41a. An outlet port 42 of brake booster 16 is connected to the reservoir 11 by means of conduits 43 and 44 and is also connected to the control valves 29 and 29a through means of conduits 43 and 45. A brake pedal 46 is operatively connected to the brake booster 16 by means of a rod 47, and sensors 48 and 48a, for detecting the number of revolutions of each of the wheels 27 and 27a, are secured to each of the wheels 27 and 27a and are electrically connected to a computer 49 which is electrically connected to each of the control valves 29 and 29a.

Figure 2:
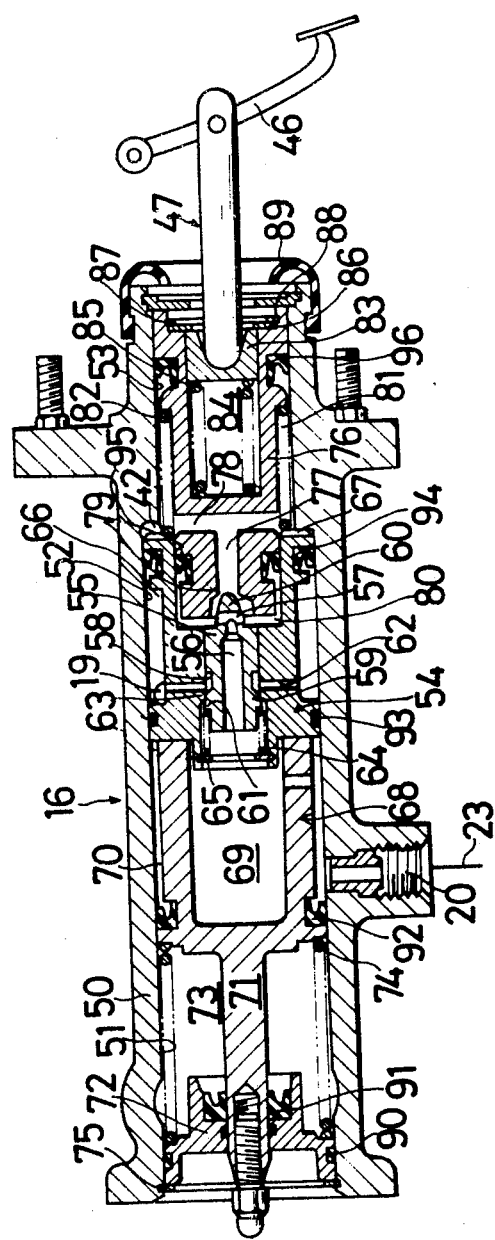
FIG. 2 is a cross-sectional view of a brake booster utilized within the system of FIG. 1.

The brake booster 16 will now be described hereinbelow in detail. With particular reference being made to FIG. 2, the brake booster 16 is seen to comprise a cylinder body 50 having a stepped bore 51 including a large diameter bore 52 and a small diameter bore 53. A piston 54 is slidably disposed within the large diameter bore 52 and a valve piston 55 is slidably disposed within piston 54. The valve piston 55 includes an axial passage 56 and a radial passage 57, an outer groove 58 formed upon the outer peripheral surface thereof, first and second valve portions 59 and 60, and a shoulder portion 61.

The piston 54 is provided with a radial passage 62 which provides fluidic communication between the inlet port 19 and the outer groove 58 of valve piston 55, and a seat portion 63 is defined upon the inner peripheral surface of the piston 54 for seating the valve portion 59 of valve piston 55 thereon, a spring 64, for biasing the valve piston 55 toward the right, being interposed between a spring retainer 65, fixedly provided upon one end of the piston 54, and a shoulder portion 61 of valve piston 55. A chamber 66, communicating with the inlet port 19, is defined between the outer peripheral surface of piston 54 and the large bore portion 52 of body 50, and an annular groove 67, communicating with the outlet port 42, is defined upon the right end portion of piston 54.

A power piston 68 is also slidably disposed within the large diameter bore 52 and is in contact with the piston 54 at the right end portion thereof. A power chamber 69 is defined within power piston 68, and an annular chamber 70, communicating with the outlet port 20, is defined between the outer peripheral surface of power piston 68 and bore portion 52 of body 50. Power piston 68 is also provided with a rod portion 71 the cantilevered end of which is supported by means of a supporting member 72 disposed within the large diameter bore 52 and which is operatively connected to the master cylinder 37. An annular chamber 73, communicating with the reservoir 11, is defined by the supporting member 72 and the power piston 68, and a spring 74, for biasing the power piston 68 toward the right, is interposed between the supporting member 72 and the power piston 68, it also being noted that the leftward movement of the supporting member 72 is limited by means of a snap ring 75.

A control piston 76 is slidably disposed within the small diameter bore 53 and includes an axial passage 77 and a radial passage 78. A seat portion 79 is defined at the forward axial portion of piston 76 and upon the inner peripheral surface of the control piston 76 defining passage 77 for seating the second valve portion 60 of the valve piston 55 thereon. A chamber 80 is defined between the piston 54 and the control piston 76, and a chamber 81, defined by the outer peripheral surface of control piston 76 and the small bore portion 53 of body 50 is in communication with the radial passage 78 of control piston 76, a spring 82, for biasing the control piston 76 toward the right, being disposed within chamber 81.

A transmitting member 83 is slidably disposed within control piston 76 and a chamber 84 is defined by means of the control piston 76 and the transmitting member 83, a spring 85, for biasing the transmitting member 83 toward the right, being disposed within chamber 84. A retainer 86 and a snap ring 87 are fixed to the control piston 76 for limiting the rightward movement of the transmitting member 83, and a snap ring 88 is also fixed to the cylinder body 50. A boot 89 is fixedly attached to the cylinder body 50, and the rod 47 operatively contacts the transmitting member 83, seal members being denoted by the reference characters 90–96.

Figure 3:
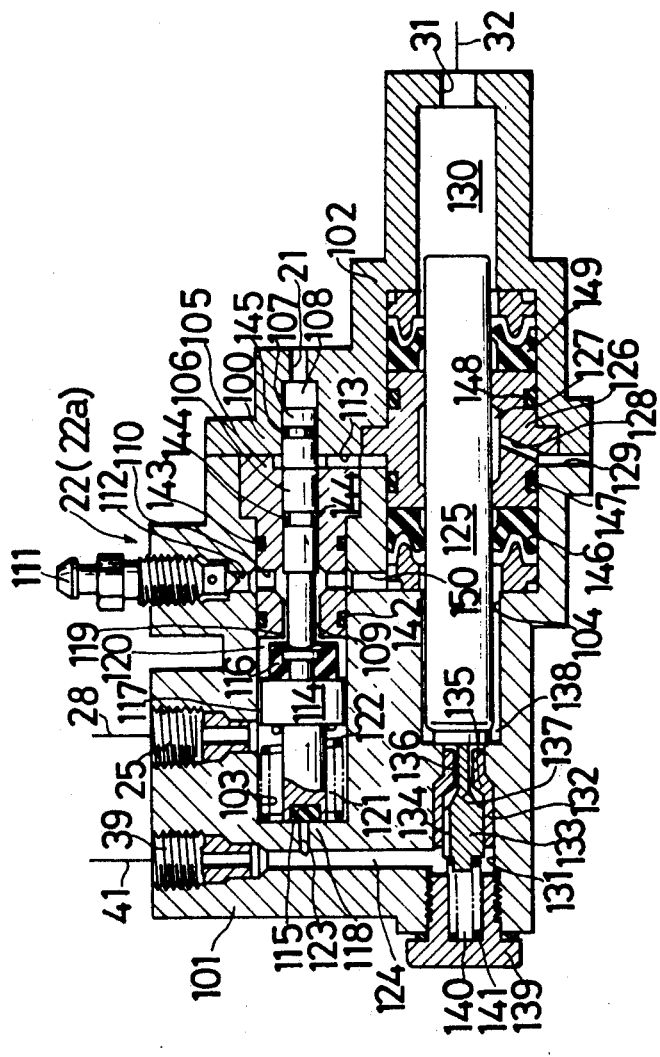
FIG. 3 is a view similar to that of FIG. 2, showing however an actuator utilized within the system of FIG. 1.

The actuator 22 will now be representatively described hereinbelow in detail, as the construction of actuator 22a is similar to that of actuator 22. With particular reference being made to FIG. 3, the actuator 22 is seen to include a housing 100 having first and second cylinder bodies 101 and 102, two cylinder bores 103 and 104 being disposed parallel to each other. A guide member 105 is fixedly disposed within cylinder bore 103 and first and second pistons 106 and 107 are slidably disposed within the guide member 105. A chamber 108, communicating with the inlet port 21, is defined by the right end face of the second piston 107 and the second cylinder body 102.

An axial passage 109 and a radial passage 110 are formed within guide member 105 and the radial passage 110 communicates with an air breather 111, threadedly secured within the first cylinder body 101, by means of a passage 112 also provided within the first cylinder body 101, a passage 113 being defined by the right end face of the guide member 105 and an inner wall of the second cylinder body 102. A valve piston 114 is slidably disposed within the cylinder bore 103 and includes first and second valve members 115 and 116 and an annular passage or chamber 117 defined about piston 114. A seat portion 118 is provided upon an inner wall of the first cylinder body 101 for seating the first valve member 115 thereon, and a seat portion 119 is also provided upon the left end portion of the guide member 105 for seating the second valve member 116 thereon.

A chamber 120, adapted to communicate with the axial passage 109 of the guide member 105, is defined by means of the second valve member 116 and the left end portion of the guide member 105, and a chamber 121, communicating with the outlet port 25 is defined by means of the inner wall of the first cylinder body 101 and the left end face of valve piston 114. A spring 122, for biasing the valve piston 114 toward the right, is disposed within chamber 121 and the two chambers 120 and 121 are in communication with each other by means of the passage 117 of the valve piston 114. An axial passage 123 is also formed within the first cylinder body 101 and is in communication with the inlet port 39 by means of a radial passage 124 formed within the first cylinder body 101. A piston 125 is slidably disposed within the cylinder bore 104 and is guided therein by means of an annular guide member 126 fixed between the cylinder bodies 101 and 102. The guide member 126 is provided with an axial passage 127 and an inclined passage 128 fluidically connected thereto and which communicates with the atmospheric air by means of a radial passage 129 defined between the first and second cylinder bodies 101 and 102 and likewise in communication with the passage 113, a chamber 130, communicating with the port 31, being defined by means of the piston 125 and the second cylinder body 102.

A cylinder bore 131 is also provided within the first cylinder body 101 and a seat member 132 is fixedly disposed within the cylinder bore 131 while a valve piston 133 is slidably disposed within the seat member 132. The seat member 132 includes an axial passage 134 and a seat portion 135, and the valve piston 133 defines an axial passage 136 with seat member 132, a valve portion 137, for seating upon the seat portion 135 of the seat member 132, also being defined therein. A chamber 138 is defined by means of valve piston 133 and piston 125, along with bore portion 104, and a plug 139 is threadedly engaged within the first cylinder body 101, a chamber 140, communicating with the passage 124, being defined within and by means of the plug 139, and valve piston 133. A spring 141, for biasing the valve piston 133 toward the right, is disposed within chamber 140, and seal members are denoted by the reference numerals 142–149, a passage 150, for communicating passage 110 of guide member 105 with chamber 138, being defined within the first cylinder body 101.

The operation of the brake system of FIG. 1 will now be described hereinbelow in detail. When the brake pedal 46 is depressed by means of the vehicle driver, the depression force of brake pedal 46 is transmitted to the transmitting member 83 through means of the rod 47 and subsequently to the control piston 76 by means of spring 85. Accordingly, the control piston 76 is moved toward the left by means of spring 85, as seen in FIG. 1, and consequently, the valve portion 60 of valve piston 55 is seated upon seat portion 79 of control piston 76 whereby fluidic communication between chambers 80 and 78, through means of the axial passage 77 of control piston 76 is interrupted. Concomitantly therewith, the valve piston 55 is moved toward the left along with the control piston 76 and against the rightward biasing force of spring 64, and consequently, the valve portion 59 of valve piston 55 is released from the seat portion 63 of piston 54 and thereafter, the power chamber 69 and the radial passage 62 of piston 54, which is fluidically connected to the inlet port 19, are in communication with each other by means of the groove 58.

Consequently, the hydraulic fluid pressure within power chamber 69 is increased, as a result of fluid being supplied from pump 10 to groove 58 through means of conduit 14, unloader valve 13, accumulator 18, conduit 17, inlet port 19 and passage 62, and a result of such increase in hydraulic fluid pressure within power chamber 69, the rod portion 71 of power piston 68 is moved toward the left whereby the master cylinder 37 becomes operable, that is, the hydraulic fluid pressure within master cylinder 37 is increased. It should also be noted that the fluid pressure increased within chamber 69 of brake booster 16 is also transmitted to chamber 80 and acts upon control piston 76, spring 85, transmitting member 83, rod 47 and brake pedal 46, and consequently, a reaction force is sensed by the vehicle driver during the above-mentioned braking operation.

The fluid pressure increased within master cylinder 37 is in turn transmitted to the inlet port 39 of actuator 22 through means of conduits 40 and 41, and such fluid pressure is further transmitted to the outlet port 25 thereof by means of passage 124, chamber 140, passage 134 of valve piston 133, passage 136, chamber 138, passage 150, passage 110 of guide member 105, passage 109, chamber 120, passage 117 of valve piston 114, and chamber 121. The fluid pressure supplied from master cylinder 37 to the outlet port 25 of actuator 22 is then transmitted still further to the wheel cylinders 26 of front wheels 27 through means of conduit 28 whereby the vehicle is able to be braked.

Concomitantly therewith, the increased fluid pressure within chamber 69 of brake booster 16 is also transmitted to the inlet port 21 of actuator 22 through means of conduits 23 and 24, and accordingly, such fluid pressure is supplied to chamber 108 of actuator 22, which is in fluidic communication with inlet port 21, and as a result of such fluid pressure, pistons 114, 106, and 107 are moved toward the left, as seen within FIG. 3. Consequently, the valve portion 115 of valve piston 114 is seated upon portion 118 of the first cylinder body 101 whereby fluidic communication between the passage 123 and the chamber 121 is interrupted, while valve portion 116 of valve piston 114 is released from the seat portion 119 of guide member 105 whereby fluidic communication between the chamber 120 and passage 110 of guide member 105 is established through means of passage 109.

The fluid pressure within conduit 24 is also transmitted to port 31 of actuator 22 through means of conduit 30, control valve 29 and conduit 32, and consequently, piston 125 of actuator 22 is also moved toward the left by means of the fluid pressure within chamber 130 which is in fluidic communication with port 31 as viewed within FIG. 3. Accordingly, the valve piston 133 is in turn moved toward the left, against the rightward biasing force of spring 141, as a result of the leftward movement of piston 125, and consequently the valve portion 137 of valve piston 133 is released from the seat portion 135 of seat member 132, as viewed within FIG. 3 whereby fluidic communication between chambers 140 and 138 is established through means of passage 134 of valve piston 133 and passage 136. The fluid pressure within conduit 32 is then transmitted to the wheel cylinders 26 of front wheels 27 whereby the vehicle is braked.

When the depression force upon the brake pedal 46 is terminated by the vehicle driver during the above-mentioned braking operation, the valve piston 55 of brake booster 16 is returned to the state shown within FIG. 2, that is, the valve portion 59 of valve piston 55 is seated upon the seat portion 63 of piston 54, thereby interrupting the fluidic communication between the power chamber 69 and the inlet port 19, and the valve portion 60 of valve piston 55 is released from the seat portion 79 of control piston 76, whereby the fluid pressure within power chamber 69 is drained to the reservoir 11 by means of passages 56 and 57 of valve piston 55, chamber 80, passages 77 and 78 of control piston 76, chamber 81, outlet port 42, and conduits 43 and 44. Accordingly, the fluid pressure supplied from master cylinder 37 to the wheel cylinders 26 of front wheels 27 is decreased, and the fluid pressure supplied from the outlet port 20 of brake booster 16 to the wheel cylinders 26 of front wheels 27 is also decreased through both paths including conduit 24 and actuator 22 as well as through conduit 32 from conduit 24, conduit 36 check valve 34, and conduit 35, the braking operation thereby being in a non-actuated or terminated state.

The above-mentioned releasing operation of the brake pedal 46 causes the fluid pressure within inlet port 39 and port 21 of actuator 22 to be decreased in equal amounts or to the same degree, however, when the brake pedal 46 is rapidly released, the decreasing pressure within chamber 108 of actuator 22 is overcome by means of spring 122 which biases the valve piston 114 toward the right, as seen in FIG. 3, whereby the valve portion 115 of valve piston 114 is released from the seat portion 118 of the first cylinder body 101, and consequently, passage 124 and chamber 121 are in communication with each other through means of passage 123. As a result, the fluid pressure supplied from master cylinder 37 of wheel cylinders 26 of front wheels 27 is also decreased through means of passage 123.

In the event that the computor 49 senses through means of the sensors 48, that the front wheels 27, for example, are locked or about to be locked, a solenoid, not shown, of the control valve 29 is energized by means of the computor 49 and consequently, communication between conduits 32 and 30 is blocked and the conduit 32 is connected to conduit 45 which is fluidically connected to reservoir 11 through means of conduit 44. It is thus apparent that the fluid pressure within chamber 130 of actuator 22, which is connected to conduit 32 through means of port 31, is decreased and consequently, the fluid pressure supplied to the wheel cylinders 26 of front wheels 27 is also decreased. Under these conditions, as the fluid pressure within chamber 130 of actuator 22 is decreased, the piston 125 will be moved toward the right, as seen within FIG. 3, and as a result, fluidic capacity of chamber 138 is increased. Accordingly, the valve piston 133 is moved toward the right by means of spring 141, as seen within FIG. 3, and the valve portion 137 of valve piston 133 is seated upon the seat portion 135 of seat member 132 whereby the fluidic communication between chambers 140 and 138, through means of passage 134 of valve piston 133, is blocked, and thereafter the fluid pressure from master cylinder 37 to the wheel cylinders 26 of front wheels 27 is not supplied, thereby alleviating the locked condition of front wheels 27. When the locked condition of front wheels 27 has been released, normal braking operation is again resumed.

If a hydraulic failure occurs within pump 10 and/or conduit 17, for example, when the brake pedal 46 is depressed by the vehicle driver, the depression force of brake pedal 46 is transmitted to the transmitting member 83 through means of the rod 47 and ultimately to the control piston 76 by means of spring 85. Accordingly, the control piston 76 is moved toward the left, by means of spring 85 as seen in FIG. 1, and comes into contact with piston 54 which is correspondingly moved toward the left in an integral manner along with control piston 76 so as to in turn move power piston 68 and the rod portion 71 thereof toward the left whereby the master cylinder 37 becomes operable, that is, the hydraulic fluid pressure within master cylinder 37 is increased.

The increased fluid pressure within master cylinder 37 is transmitted to the inlet port 39 of actuator 22 through means of conduits 40 and 41, and such fluid pressure is further transmitted to the outlet port 25 thereof through means of passage 124, chamber 140, passage 134 of valve piston 133, passage 136, chamber 138, passage 150, passage 110 of guide member 105, passage 109, chamber 120, passage 117 of valve piston 114, and chamber 121. The fluid pressure supplied from master cylinder 37 to the outlet port 25 of actuator 22 is then further transmitted to wheel cylinders 26 of front wheels 27 through means of conduit 28 whereby the vehicle is braked even when, or under the condition that, the pump 10 and the conduit 17, or the like, are damaged.

Figure 4:
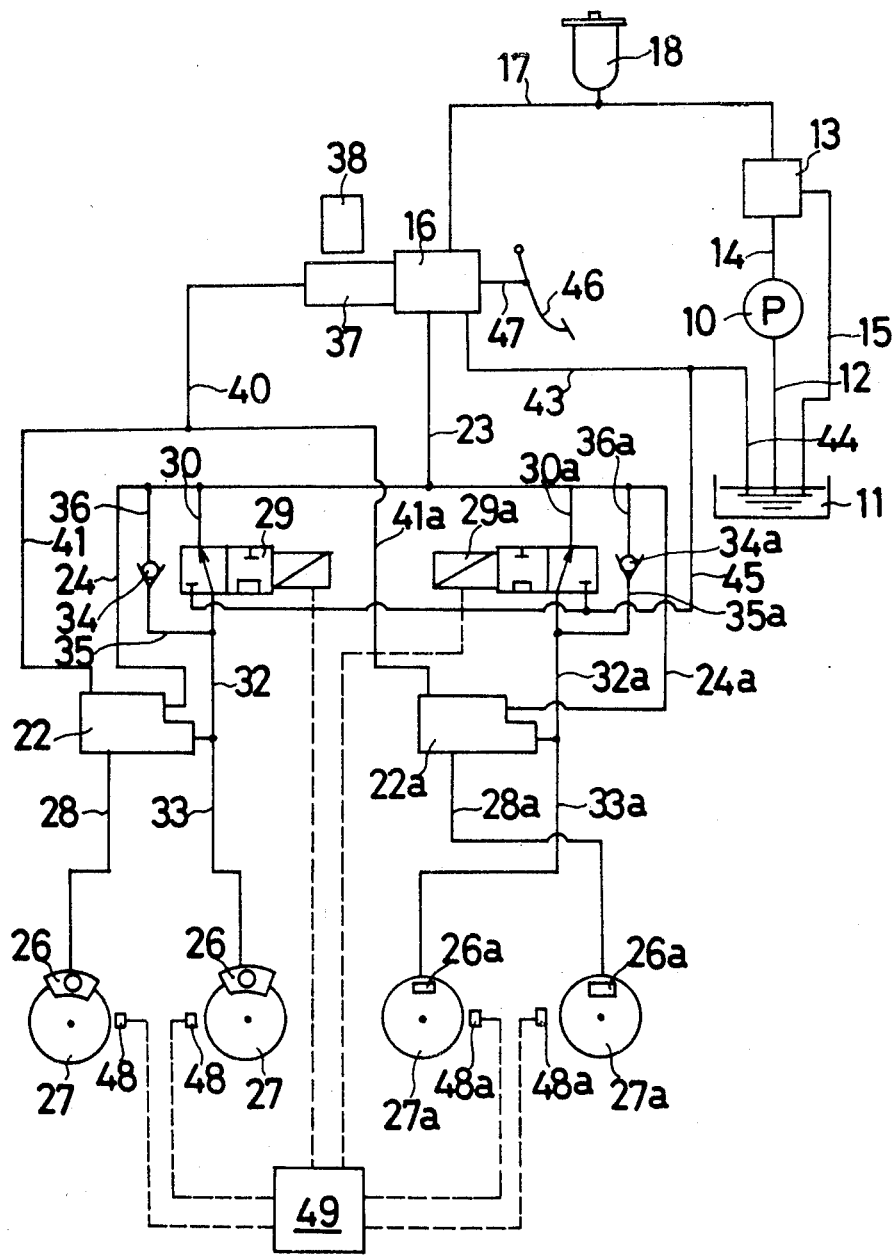
FIG. 4 is a view similar to that of FIG. 1, showing however a second embodiment of the present invention.

Referring now to FIG. 4 which shows another embodiment of the present invention, within this embodiment, the outlet port 25 of actuator 22 is connected to only one of the brake cylinders 26 of front wheels 27 through means of conduit 28 while the port 31 thereof is connected to the other brake cylinder 26 of the other front wheel 27 through means of conduit 33. Similarly, the outlet port 25a of actuator 22a is connected to only one of the brake cylinders 26a of the rear wheels 27a through means of conduit 28a while the port 31a thereof is connected to the other brake cylinder 26a of the other front wheel 27a through means of conduit 33a. In the event that the master cylinder portion of the system is damaged, the right brake cylinder 26 of front wheel 27 and left brake cylinder 26a of rear wheel 27a are nevertheless operable, and similarly, in the event that the brake booster portion of the system is damaged, the left brake cylinder 26 of front wheel 27 and the right cylinder 26a of rear wheel 27a remain operable. The remaining operations of this embodiment are similar to those of the embodiment of FIG. 1, and therefore, a detailed description of the same is omitted herefrom.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by letters patent of the United States is:

1. An anti-skid brake control system comprising:
   a source of fluid pressure;
   front and rear wheel brake means;
   brake booster means fluidically connected to said source of fluid pressure for generating power pressure;
   master cylinder means operatively connected to said brake booster means for supplying fluid pressure to said front and rear wheel brake means in accordance with the actuation of said brake booster means;
   control valve means interposed between one of said front wheel brake means and said brake booster means and between one of said rear wheel brake means and said brake booster means for supplying said power pressure of said brake booster means to said front and rear wheel brake means and for decreasing said power pressure supplied to said front and rear wheel brake means according to a skid condition of said front and rear wheel brake means; and
   actuator means interposed between the other one of said front wheel brake means and said master cylinder means and between the other one of said rear wheel brake means and said master cylinder means for supplying fluid pressure to said other ones of said front and rear wheel brake means in accordance with the actuation of said master cylinder, whereby said anti-skid control system supplies said power pressure of said brake booster means to said actuator means for actuating said actuator means in order to supply said fluid pressure from said master cylinder means to said front and rear wheel brake means under normal braking operations and for blocking said fluid pressure from said master cylinder means to said front and rear wheel brake means under skid conditions.

2. An anti-skid brake control system as set forth in claim 1, wherein said actuator means comprises:
   a first valve piston, and a first piston for controlling said first valve piston, for increasing said fluid pressure from said master cylinder means to said front and rear wheel brake means in accordance with a normal braking operation and a skid condition.

3. An anti-skid brake control system as set forth in claim 2, wherein said actuator means further comprises:
   a second valve piston, and a second piston for controlling said second valve piston, for increasing or decreasing said fluid pressure from said master cylinder means to said front and rear wheel brake means in accordance with a normal braking operation.

* * * * *